June 18, 1946.   E. VENNIGERHOLZ   2,402,216
MEANS FOR SECURING IMPROVEMENTS IN IMAGE FORMATION
Filed March 5, 1942
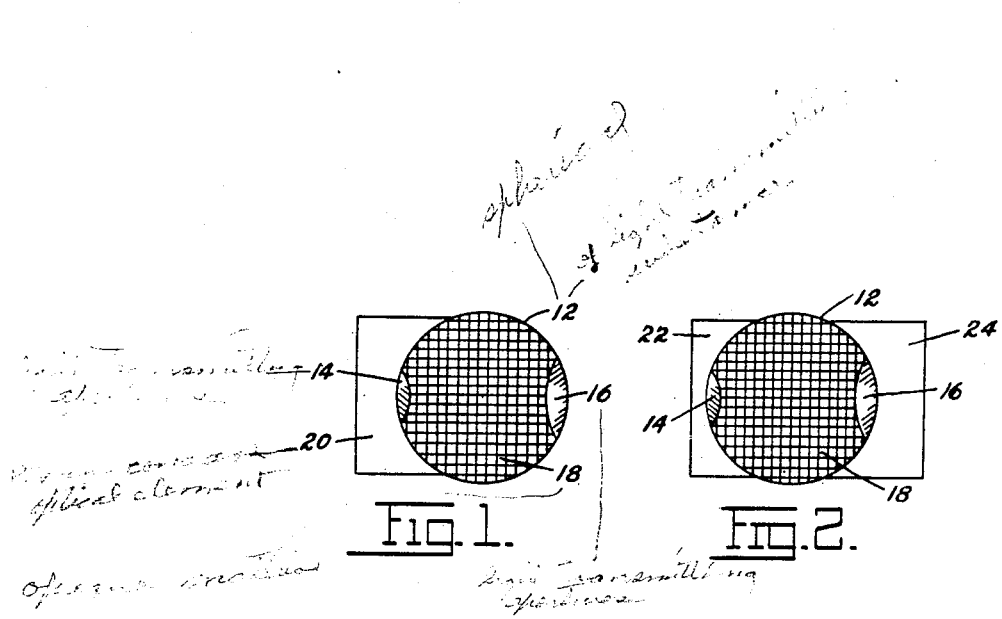
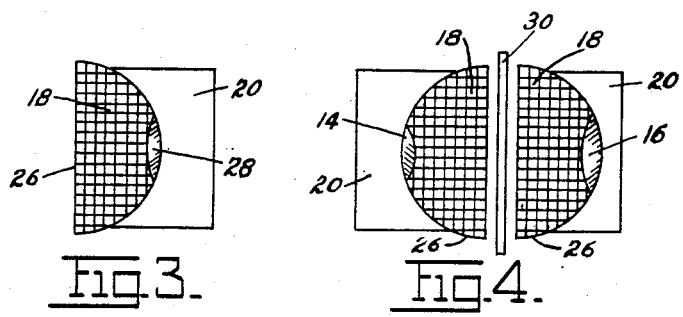
EDWARD VENNIGERHOLZ
INVENTOR
BY Edward M. Shealy
ATTORNEY Patented June 18, 1946

2,402,216

UNITED STATES PATENT OFFICE 2,402,216

MEANS FOR SECURING IMPROVEMENTS IN IMAGE FORMATION

Edward Vennigerholz, Moscow, Idaho

Application March 5, 1942, Serial No. 433,417

6 Claims. (Cl. 88—57)

The present invention relates to improvements in the art of image formation, and is concerned more particularly with the means by which this may be accomplished.

One of the greatest needs, in the art of image formation, has been the provision of an optical element with a wide angle view which will produce an exact point-to-point reproduction of all objects within the angle of view, in their relative positions and dimensions, and which will include the natural depth of perspective as perceived in normal vision. Present-day lenses, now in use, have a narrow limited view as compared with normal vision. This limitation results from the necessity of reducing to a minimum the chromatic and spherical aberrations which are produced by extant lenses.

Lenses now in use fail to give exact point-to-point reproductions due to the fixed focii of each surface of the lens being in an unbalanced position relative to the common radius point of their complementary cycle along the axis of perspective, thereby making them prismatic. As a result of this unbalanced position, objects in the immediate foreground and in the distant background are not reproduced sharply and distinctly, because of the inherent principle of refraction which is also affected by this same unbalance.

Chromatic and spherical aberrations are inherent in present-day lenses because such lenses are essentially lenticular prisms in design and therefore produce such aberrations due to their disturbance of the natural state of collimation of the inherent principle of refraction. I have discovered that a perfect image may only be formed by an optical element which will not disturb the natural collimation of the inherent principle of refraction.

By means of prolonged experimentation I have found that depth of perspective or depth of focus, for example in photography, may be obtained optically through the proper treatment of reflected light emanating from the objective subject matter, to the sensitized photographic paper. This has not been accomplished in present-day photography, using lenses of the type now generally employed. In order to accomplish this result, it is necessary that the reflected light, mentioned above, be maintained in its natural state of collimation in its treatment by an optical element. This natural state of collimation may be maintained only by proper application of the principles of incidence and reflection. For example, it may be pointed out, that to the human eye, the reflected image from a mirrored plane surface is always a true reproduction of the objective subject matter in all dimensions. To maintain reflected light in its natural state of collimation as it is propagated by an optical element, the optical element must be so constructed that it will not disturb the state of collimation of reflected stages of light upon the reflective surfaces of the optical element.

By means of a novel application of the principles of light reflection, and through prolonged experimentation, I have devised certain optical elements which are light gathering mediums having a wide angle range, and which will produce accurate, clear, and undistorted images in an exact point-to-point reproduction of all objects within the angle of view, in their relative dimensions, and including the natural depth of perspective as perceived in normal vision.

One object of the present invention, then, is to provide image forming means having a truly universal focus, so as to simply and efficiently erect, reproduce, or transmit true images of the objective subject matter, in the fields of photography, projection of images, television, microscopy, and other related fields in which optical elements or lenses are employed.

Another object of the present invention is to provide in the art of image formation, means for forming images that have steroscopic relief, solidity, and depth of perspective.

A further object of this invention is the elimination of distortions such as linear distortion, chromatic and spherical aberrations, and like distortions caused by unnatural refraction.

A still further object of my invention is to provide for the erection of brighter and clearer images than can now be obtained with the optical elements or lenses in present-day use.

Still another object of my invention is to provide an optical element or lens which will erect, reproduce, or transmit a brighter and more intense image with a given amount of illumination than is now possible using present-day optical elements or lenses. This is commonly known as increasing the "speed" of lenses.

Still another object of my invention is to eliminate expensive and intricate optical element construction.

Other and further objects and advantages of my invention will become apparent throughout the course of the following description and appended claims.

In the accompanying drawing, in which I have illustrated several preferred and practical embodiments of my invention:

Fig. 1 is a side view of one preferred and practical form of the novel optical element of my invention;

Fig. 2 is a side view of another preferred and practical form of the novel optical element of my invention;

Fig. 3 is a side view of another modified form of the new and novel optical element or lens of my invention; and, Fig. 4 is a side view of still another modified form of the novel optical element or lens of my invention in conjunction with a diaphragm or shutter.

Throughout the several views of the accompanying drawing, the same reference numerals have been used to designate the same or like parts.

Although my drawing illustrates several preferred and practical embodiments of my invention, it is to be understood that this drawing is merely illustrative, and that my inventive concepts are susceptible of other embodiments and utilizations, and that the illustrated embodiments are likewise susceptible of a wide range of variation and modification, without departing from the spirit of my invention or the scope of the appended claims.

Referring to the drawing in detail, and first adverting to Fig. 1 where I have shown one of the preferred and practical forms of my invention, the reference numeral 12 has been used to generally designate an optical element having true or approximately true spherical form. This optical element 12 may be made of any desired light-transmitting substance such as glass, plastics, or other suitable material and it may either be solid or hollow, and if hollow it may be either evacuated or filled with air, gas, liquid or any other suitable light-transmitting medium. The surface of this spherical optical element 12 is entirely covered, with the exception of the light-transmitting apertures which have been designated generally by the reference numerals 14 and 16, with an opaque material designated by the reference numeral 18. The opaque covering material 18 may consist of paint, silvering, cloth, fiber, or any other suitable material which will prevent the passage of light. The light-transmitting apertures 14 and 16 are left uncovered by the opaque material 18 on the surface of the spherical optical element 12. If desired, the light-transmitting apertures 14 and 16 may be approximately circular in shape and are positioned on the surface of the spherical optical element at opposite ends of the central axis of the optical element. The light-transmitting aperture 14 has a diameter approximately one-fourth the diameter of the spherical optical element 12, while the light-transmitting aperture 16 has a diameter approximately one-half the diameter of the spherical optical element 12. It will thus be seen that the relationship of the diameters of the light-transmitting apertures 14 and 16 to each other, is approximately 1:2.

From prolonged experimentation I have discovered that an aperture of greater size than approximately one-fourth the diameter (as a maximum) of the spherical optical element cannot be used if the incident reflected light is to be maintained in its natural state of collimation as it is propagated by the optical element. If this is not done the reflected light is not focused to a common point or plane, distortion occurs, and the lens is subject to the same defects as present day lenses. The natural function of incident and reflected light from spherical convex and spherical concave surfaces thus gives rise to apertures one-fourth and one-half the diameter of the spherical optical element respectively and hence the relationship of 1:2 is maintained. A convex surface can only focus light to a common point through one-half the angle which a concave surface focuses. Relative to a spherical optical element such as that contemplated by my present invention, the surface to which the light rays are incident is convex while the relationship of the opposite side is concave.

The spherical optical element 12 is used in conjunction with a plano-concave optical element such as that designated generally by the reference numeral 20. This plano-concave element 20 may be made of glass, plastics or any other suitable light-transmitting material, and it may be either solid or hollow, and if hollow may be either evacuated or filled with air, gas, liquid, or any other light-transmitting medium. The plano-concave element may be placed either adjacent the smaller light-transmitting aperture 14 as shown, or it may be placed adjacent the larger light transmitting aperture 16, and the plano-concave element 20 may contact the spherical element 12 as shown, or it may be separated a suitable distance from said spherical element 12. Further, the concave side of the plano-concave optical element 20 may have either the same or a different curvature than the spherical element 12. The curvature of the plano-concave element 20 determines the distance which it must be spaced from the spherical element 12. If the curvature of the plano-concave element is the same as that of the spherical element I have discovered that for best results the plano-concave element should contact the spherical element and this is especially true in the use of two plano-concave elements as shown in Fig. 2. If the curvature of the plano-concave element is less than the curvature of the spherical element it must be spaced further from the said spherical element for best results. It will thus be readily seen that from the known geometric ratios of circles and spheres that there are possible an infinite number of spacings between the spherical element and the plano-concave element depending upon their curvatures. All of these modifications and variables provide means for changing the image size as desired, and also provide means for increasing the focal length of the spherical element 12.

Fig. 2 illustrates another modification of the new and novel optical element of my invention. In this modification the same type of spherical optical element 12 as was described in connection with Fig. 1 supra is used. This spherical element 12 has light-transmitting apertures 14 and 16 and the surface of the spherical element, with the exception of said light-transmitting apertures, is covered with an opaque covering material designated by the reference numeral 18. The spherical element 12 is used in conjunction with two plano-concave optical elements which are designated by the reference numerals 22 and 24. These plano-concave optical elements are similar to the plano-concave optical element 20 as described in connection with Fig. 1 supra. These plano-concave elements 22 and 24 may each have the same or different curvatures and thicknesses and they may either contact the spherical element 12 or each may be spaced a suitable distance from it as desired. All of these modifications and variables provide means for changing the image size and/or the focal length of the optical element as desired.

Fig. 3 illustrates still another preferred and practical embodiment of the novel optical element of my invention. In this modification a hemispherical optical element which I have designated by the reference numeral 26 is used. This hemispherical element 26 may be made from glass, plastics or any other suitable material and it may be either solid or hollow and if hollow it may be either evacuated or filled with air, gas, liquid, or any other suitable light-transmitting medium. The hemispherical element 26 has light-transmitting apertures such as 28 and the surface thereof, with the exception of the light-transmitting apertures, is covered with a suitable opaque covering material which I have generally designated by the reference numeral 18. A plano-concave optical element 20 of the type described in connection with Fig. 1 supra is used in conjunction with the hemispherical optical element 26. This plano-concave element may contact the hemispherical element as shown, or it may be spaced a suitable distance from the hemispherical element as desired, and it may have either the same or a different curvature than that of the curved surface of the hemispherical element. I have discovered that the curvature of the plano-concave element determines the distance which it must be spaced from the hemispherical element. If the curvature of the plano-concave element is the same as that of the hemispherical element the plano-concave optical element should contact the hemispherical optical element for best results. If the curvature of the plano-concave element is less than the curvature of the hemispherical element it must be spaced further from said hemispherical element for best results. It will thus be seen that there are possible an infinite number of spacings between the hemispherical element and the plano-concave element. All of these modifications and variables provide means for changing the image size and/or the focal length of the optical element as desired.

In Fig. 4 I have illustrated still another modification of the new and novel optical element of my invention. In this modification two of the hemispherical optical elements may be employed in conjunction with the plano concave optical elements 20, such as previously described in connection with Fig. 3. The plano-concave elements 20 may have the same or different curvatures, as desired, and they may contact the hemispherical elements 26, as shown, or they may be spaced a suitable distance from said hemispherical optical elements. As shown, the hemispherical optical elements 26 may be spaced a suitable distance from each other, and between the said hemispherical elements 26 may be placed a between-the-lens shutter, or a diaphragm, which I have indicated by the reference numeral 30 in Fig. 4.

From the foregoing description and illustrations it will be readily seen that I have provided means for securing improvements in image formation. That I have devised certain optical elements or lenses which are light-gathering mediums having a wide-angle range, that have a truly universal focus, and which provide methods and means for simply and efficiently erecting, reproducing, and transmitting true images of the objective subject matter. I have also provided means for forming images that have stereoscopic relief, solidity, and depth of perspective. That I have also provided means for erecting, reproducing, and transmitting brighter and more intense images with a smaller amount of illumination than is possible with present-day optical elements or lenses. That I have also provided means for eliminating distortion caused by unnatural refraction, such as linear distortion, chromatic and spherical aberrations, and like distortions, in the various fields of image formation.

Although I have described and shown my invention in considerable detail, it is to be understood that such description is intended as illustrative and not as limiting, as the inventive-concepts of my invention may be variously embodied.

Having thus described my invention, what I claim and desire to secure by Letters Patent is:

1. A device of the class described comprising: an optical element of spherical form, different sized circular light transmitting apertures diametrically opposed on the surface of said spherical optical element, the smaller of said light transmitting apertures having a diameter one-fourth the diameter of said spherical optical element, the larger of said light transmitting apertures having a diameter one-half the diameter of said spherical optical element, the diameters of the said light-transmitting apertures having a relationship of 1:2, opaque material covering the entire surface of the said spherical optical element with the exception of the said light-transmitting apertures, and a plano-concave optical element in conjunction with said spherical optical element, said plano-concave optical element having its concave surface turned towards the said spherical optical element and positioned a suitable distance from it.

2. A device of the class described comprising: an optical element of spherical form, different sized circular light transmitting apertures diametrically opposed on the surface of said spherical optical element, the smaller of said light transmitting apertures having a diameter one-fourth the diameter of said spherical optical element, the larger of said light-transmitting apertures having a diameter one-half the diameter of said spherical optical element, the diameters of the said light-transmitting apertures having a relationship of 1:2, opaque material covering the entire surface of the said spherical optical element with the exception of the said light-transmitting apertures, and a plano-concave optical element in conjunction with said spherical optical element, said plano-concave optical element having its concave surface turned towards the said spherical optical element and said plano-concave optical element contacting the said spherical optical element.

3. A device of the class described comprising: an optical element of approximately spherical form, different sized light-transmitting apertures diametrically opposed on the surface of said spherical optical element, the diameters of the said light-transmitting apertures having a relationship of 1:2, opaque material covering the surface of said spherical optical element with the exception of the said light-transmitting apertures, and a plano-concave optical element in conjunction with said spherical optical element, said plano-concave optical element having its concave surface turned towards the spherical optical element and positioned a suitable distance from it.

4. A device of the class described comprising: an optical element of approximately spherical form, different sized light-transmitting apertures diametrically opposed on the surface of said spherical optical element, the diameters of the said light-transmitting apertures having a relationship of 1:2, opaque material covering the surface of said spherical optical element with the exception of the said light-transmitting apertures, and a plano-concave optical element in conjunction with said spherical optical element, said plano-concave optical element having its concave surface turned towards said spherical optical element and contacting said spherical optical element.

5. A universal focus optical element comprising, an optical element having substantially spherical form, different sized light transmitting apertures on the surface of said optical element, said light transmitting apertures being diametrically opposed on the surface of said optical element, an opaque covering material contacting the surface of said optical element with the exception of the aforesaid light transmitting apertures, and a plano-concave optical element in conjunction with said spherical optical element, said plano-concave optical element having its concave surface turned towards the aforesaid spherical optical element and contacting the said optical element at one of the aforesaid light transmitting apertures.

6. A universal focus optical element comprising, an optical element of substantially spherical shape, different sized light transmitting apertures on the surface of said spherical optical element, said light transmitting apertures being diametrically opposed on the surface of said spherical optical element, an opaque covering material contacting the surface of said optical element with the exception of the aforesaid light transmitting apertures, and a plano-concave optical element in conjunction with said spherical optical element, said plano-concave optical element being positioned a suitable distance from the aforesaid spherical optical element and having its concave surface turned towards said spherical optical element and one of its light transmitting apertures.

EDWARD VENNIGERHOLZ.